(12) United States Patent
Loldj et al.

(10) Patent No.: US 9,740,184 B2
(45) Date of Patent: Aug. 22, 2017

(54) CONTROLS INTERFACE SOLUTION FOR ENERGY SAVINGS

(75) Inventors: Youssef A. Loldj, Sunnyvale, CA (US); Maxime Cayer, Chandler, AZ (US); Tony Tong, San Jose, CA (US); Miroslav Gelo, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 272 days.

(21) Appl. No.: 12/946,423

(22) Filed: Nov. 15, 2010

(65) Prior Publication Data

US 2011/0118893 A1 May 19, 2011

Related U.S. Application Data

(60) Provisional application No. 61/261,716, filed on Nov. 16, 2009.

(51) Int. Cl.
*G06F 1/32* (2006.01)
*G06F 1/00* (2006.01)
(Continued)

(52) U.S. Cl.
CPC .......... *G05B 19/042* (2013.01); *G05B 19/00* (2013.01); *G05B 19/0405* (2013.01);
(Continued)

(58) Field of Classification Search
USPC .............. 713/300, 310, 320, 323–324; 438/5
See application file for complete search history.

(56) References Cited

U.S. PATENT DOCUMENTS 6,181,677 B1 * 1/2001 Valli et al. ............... 370/228
6,233,492 B1 5/2001 Nakamura et al.
(Continued)

FOREIGN PATENT DOCUMENTS

JP 3263541 A 11/1991
JP 2004190972 A 7/2004

OTHER PUBLICATIONS

International Search Report and Written Opinion mailed Jul. 1, 2011 for PCT Application No. PCT/US2010/056821.
(Continued)

*Primary Examiner* — Tanh Nguyen
(74) *Attorney, Agent, or Firm* — Moser Taboada; Alan Taboada (57) ABSTRACT

Methods and apparatus for enhanced control over electronic device manufacturing systems are provided herein. In some embodiments, the integrated sub-fab system may employ Ethernet and/or RS232 Serial communications through an open platform of apparatus to achieve a reduced carbon footprint during electronic device manufacturing. For this example, the system could include a process tool set and controller linked by sensors or software interconnect with one or more sub-fab or local factory auxiliary systems that can be operated in one or more states of energy consumption. These one or more auxiliary systems can be switched between different levels of energy consumption, as required by the process, via the controller. For many auxiliary components or systems the integrated sub-fab system utilizes existing signal outputs, for others they may employ secondary sensors or monitors.

12 Claims, 4 Drawing Sheets

(51) Int. Cl.
*G05B 19/042* (2006.01)
*G05B 19/04* (2006.01)
*G05B 19/00* (2006.01)

(52) U.S. Cl.
CPC .............. *G05B 2219/23316* (2013.01); *G05B 2219/25286* (2013.01); *G05B 2219/34306* (2013.01); *G05B 2219/45031* (2013.01); *Y02P 80/10* (2015.11); *Y02P 80/114* (2015.11)

(56) References Cited

U.S. PATENT DOCUMENTS

| | | | |
|---|---|---|---|
| 6,304,999 | B1 | 10/2001 | Toprac et al. |
| 7,201,851 | B2 | 4/2007 | Kitoku et al. |
| 7,212,977 | B2* | 5/2007 | Tsuji et al. ..................... 705/63 |
| 7,376,490 | B2 | 5/2008 | Ueno et al. |
| 2006/0175553 | A1 | 8/2006 | Tomine |
| 2007/0227448 | A1 | 10/2007 | Tomine |
| 2008/0167772 | A1 | 7/2008 | Du et al. |
| 2008/0208386 | A1 | 8/2008 | Tomine et al. |
| 2009/0088874 | A1* | 4/2009 | Arceo ................ G05B 19/0428 700/79 |
| 2009/0195349 | A1 | 8/2009 | Frader-Thompson et al. |
| 2009/0222128 | A1 | 9/2009 | Clark et al. |
| 2010/0057263 | A1* | 3/2010 | Tutunoglu ........... F24F 11/0086 700/282 |
| 2010/0070785 | A1* | 3/2010 | Fallin et al. ................... 713/320 |
| 2010/0106992 | A1 | 4/2010 | Schauer |
| 2011/0118893 | A1* | 5/2011 | Loldj et al. .................... 700/295 |
| 2012/0253500 | A1 | 10/2012 | Smith et al. |

OTHER PUBLICATIONS

Search Report from the State Intellectual Property Office of the People's Republic of China dated Sep. 24, 2014 for Chinese National Phase Application No. 201080051956.4.
Search Report for Taiwan Invention Patent Application No. 099139394 dated Aug. 14, 2015.

* cited by examiner

CONTROLS INTERFACE SOLUTION FOR ENERGY SAVINGS

CROSS-REFERENCE TO RELATED APPLICATIONS

This application claims benefit of U.S. provisional patent application Ser. No. 61/261,716, filed Nov. 16, 2009, which is herein incorporated by reference.

FIELD

The present invention is related to the manufacture of electronic devices, and more specifically, to systems and methods for increasing the efficiency of electronic device manufacturing systems.

BACKGROUND

Electronic device manufacturing facilities, or "fabs", typically employ process tools which perform manufacturing processes in the production of electronic devices. Such processes may include physical vapor deposition, chemical vapor deposition, etch, cleaning and other electronic device manufacturing processes. It should be understood that the present invention is not limited to any particular electronic device manufacturing process. A fab is typically laid out with a clean room on one floor, and a room containing auxiliary systems and devices which support the clean room on a lower floor, herein referred to as a "sub-fab." For ease of reference, the phrases 'auxiliary systems' and 'auxiliary devices' may be used interchangeably herein to describe a sub-fab system and/or device. One important function of the sub-fab is to abate toxic, flammable or otherwise potentially harmful substances which are common byproducts of electronic device manufacturing processes. Sub-fabs commonly utilize large amounts of energy and create large amounts of waste heat, which may have a detrimental environmental effect and which may be very expensive for a fab operator.

Thus, the inventors have provided an improved sub-fab control which uses less energy, amongst other benefits, without negatively impacting a fab's production.

SUMMARY

Methods and apparatus for enhanced control over electronic device manufacturing systems are provided herein. In some embodiments, the integrated sub-fab system may employ Ethernet and/or RS232 Serial communications through an open platform of apparatus to achieve a reduced carbon footprint during electronic device manufacturing. For this example, the system could include a process tool set and controller linked by sensors or software interconnect with one or more sub-fab or local factory auxiliary systems that can be operated in one or more states of energy consumption. These one or more auxiliary systems can be switched between different levels of energy consumption, as required by the process, via the controller. The integrated sub-fab system may also measure and tabulate the energy consumed for each component in real time, or as requested reporting. For many auxiliary components or systems the integrated sub-fab system utilizes existing signal outputs, for others they may employ secondary sensors or monitors.

In some embodiments, an apparatus for providing a fail-safe communications standard for a power managed sub-fab may include a sub-fab configured to operate in a power managed state based upon one or more commands received from a controller; receive a heartbeat signal from the controller; and exit the power managed state and enter a full power operational state in response to failing to receive the heartbeat signal for a specified timeout interval.

In some embodiments, a system for providing a fail-safe communications standard for a power managed sub-fab may include a controller configured to send one or more commands to a sub-fab to configure the sub-fab to operate in one or more power managed states; and send a heartbeat signal to the sub-fab to indicate that the sub-fab is still in communication with the controller; and a sub-fab configured to operate in the one or more power managed states as configured by the controller; receive the heartbeat signal from the controller; and operate in a full power operational state in response to a failure to receive the heartbeat signal within a specified timeout interval.

In some embodiments, a method for providing a fail-safe communications standard for a power managed sub-fab may include operating the sub-fab in a power managed state; determining whether a heartbeat signal has been received within a specified timeout interval; and operating the sub-fab in a full power operational state in response to a failure to receive the heartbeat signal within the specified timeout interval.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention provide improved control systems for a sub-fab that may advantageously reduce energy usage, and operational cost, of electronic device manufacturing systems.

The sub-fab may contain such auxiliary devices as abatement tools, AC power distributors, primary vacuum pumps, spare vacuum pumps, water pumps, chillers, heat exchangers, process cooling water supplies and delivery systems, electrical power supplies and delivery systems, inert gas dumps, valves, device controllers, clean dry air supplies and delivery systems, ambient air supplies and delivery systems, inert gas supplies and delivery systems, fuel supplies and delivery systems, touch screens, process logic controllers, reagent supplies and delivery systems, etc. The use of this equipment causes sub-fabs to commonly utilize large amounts of energy and other resources, wear relatively quickly, and produce large amounts of waste heat, which may have a detrimental environmental effect. All of this may be very expensive for a fab operator.

One reason for this may be that sub-fab equipment has been designed to operate and has been operated continuously in high capacity modes ("high energy mode") to reduce the likelihood that the sub-fab will encounter a worst-case effluent load from the clean room which it is not able to fully abate. Such sub-fab equipment design may be effective, but inefficient, because some or most of the time the sub-fab actually encounters an effluent load which is significantly less than a worst-case effluent load. In addition to abatement resources, other resources from the sub-fab have been provided constantly in the same "worst-case," high capacity mode, even when such a high capacity is not needed.

An example of an electronic device manufacturing system having an integrated sub-fab suitable for modification and use as described herein is provided in commonly owned U.S. patent application Ser. No. 12/365,894, filed Feb. 4, 2009 by Daniel O. Clark, et al., and entitled, "Methods and Apparatus for Operating an Electronic Device Manufacturing System," and which is herein incorporated by reference in its entirety.

Figure 1:
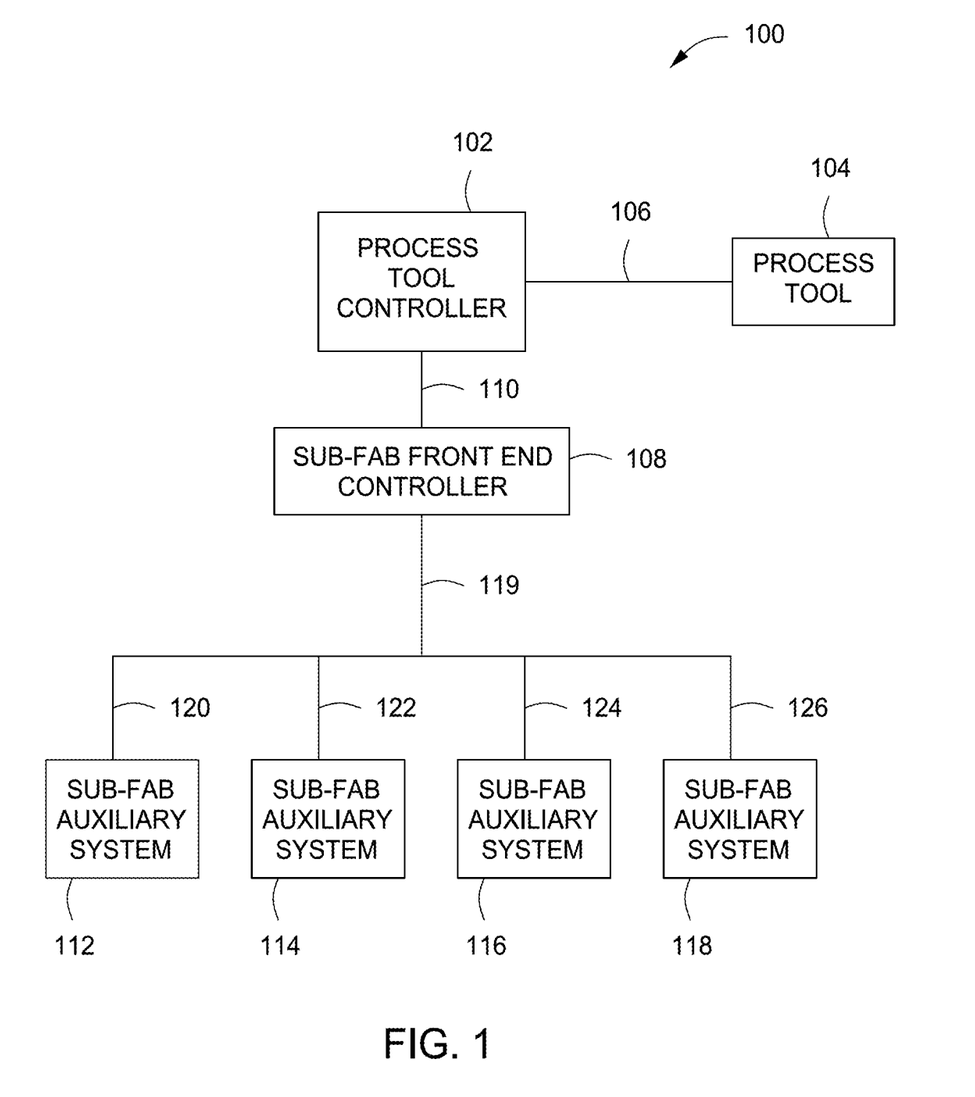
FIG. 1 is a schematic depiction of a system for operating an electronic device manufacturing system sub-fab in accordance with some embodiments of the present invention.

FIG. 1 is a schematic depiction of a system 100 for operating an electronic device manufacturing system sub-fab in accordance with some embodiments of the present invention. System 100 may include a process tool controller 102 which may be linked to a process tool 104 through communication link 106. Process tool controller 102 may be any microcomputer, microprocessor, logic circuit, a combination of hardware and software, or the like, suitable to control the operation of the process tool 104. For example, process tool controller 102 may be a PC, server tower, single board computer, and/or a compact PCI, etc. Process tool 104 may be any electronic device manufacturing process tool which requires effluent abatement and/or other resources from a sub-fab support system. Communication link 104 (and any other communication link described herein) may be hardwired or wireless and may use any suitable communication protocol such as, SECS/GEM, HSMS, OPC, and/or Device-Net.

The process tool controller 102 may be linked to a sub-fab front end controller 108 by means of communication link 110. The sub-fab front end controller 108 may be any microcomputer, microprocessor, logic circuit, a combination of hardware and software, or the like, suitable to control the sub-fab auxiliary systems/device 104. For example, sub-fab front end controller 108 may be a PC, server tower, single board computer, and/or a compact PCI, etc.

The sub-fab front end controller 108 may in turn be linked to sub-fab auxiliary systems/devices 112, 114, 116 and 118 through communication links 120, 122, 124 and 126, respectively. The sub-fab auxiliary systems/devices may each have a controller (not shown), such as a PLC. Alternatively, the sub-fab front end controller 108 may perform the functionality of a lower-level PLC controller for any or all of the sub-fab auxiliary systems/devices. Although four sub-fab auxiliary systems/devices are shown, it should be noted that more or fewer than four sub-fab auxiliary systems/devices may be linked to the sub-fab front end controller 108. Sub-fab auxiliary systems/devices may include abatement tools, ac power distributors, primary vacuum pumps, spare vacuum pumps, water pumps, chillers, heat exchangers, process cooling water supplies and delivery systems, electrical power supplies and delivery systems, inert gas dumps, valves, device controllers, clean dry air supplies and delivery systems, ambient air supplies and delivery systems, inert gas supplies and delivery systems, fuel supplies and delivery systems, touch screens, process logic controllers, reagent supplies and delivery systems, etc.

In operation, process tool controller 102 may control process tool 104 by operating one or more of robots, doors, pumps, valves, plasma generators, power supplies, etc. As described above, process tool controller 102 may be constantly aware regarding the state of, and resource requirements of, each chamber in the process tool 104 and of the process tool 104 as a whole. Process tool controller 102 may have access to a database (not shown) which the process tool controller 102 may use to calculate the resource requirements of the chambers (not shown) and the process tool 104 as a whole. In addition, the process tool controller 102 may be linked to instruments in the sub-fab (not shown) from which the process tool controller 102 may calculate the resource requirements of sub-fab systems and/or devices. Alternatively the sub-fab front end controller 108 may be linked to the instruments in the sub-fab (not shown), calculate the resource requirements of the sub-fab systems and/or devices and provide information regarding the resource requirements of the sub-fab systems and/or devices to the process tool controller 102.

The process tool controller 102 may communicate such resource requirements to the sub-fab front end controller 108 which may in turn control one or more sub-fab auxiliary systems/devices 112, 114, 116 and 118 by operating pumps, switches valves, power supplies, and/or other hardware through communication links 119, 120, 122, 124 and 126. In this fashion, the amount of energy which may be required to operate the sub-fab equipment may be reduced to a level which provides sufficient resources to safely and efficiently operate the process tool 104 and to fully abate the effluent which flows from the process tool 104. By sufficient resources is meant a minimum amount of resources to avoid negatively impacting the process tool 104 and/or the throughput and/or efficiency of the process tool 104, plus any additional amount of resources above the minimum required resources to provide a desired margin of safety and/or error.

Figure 2:
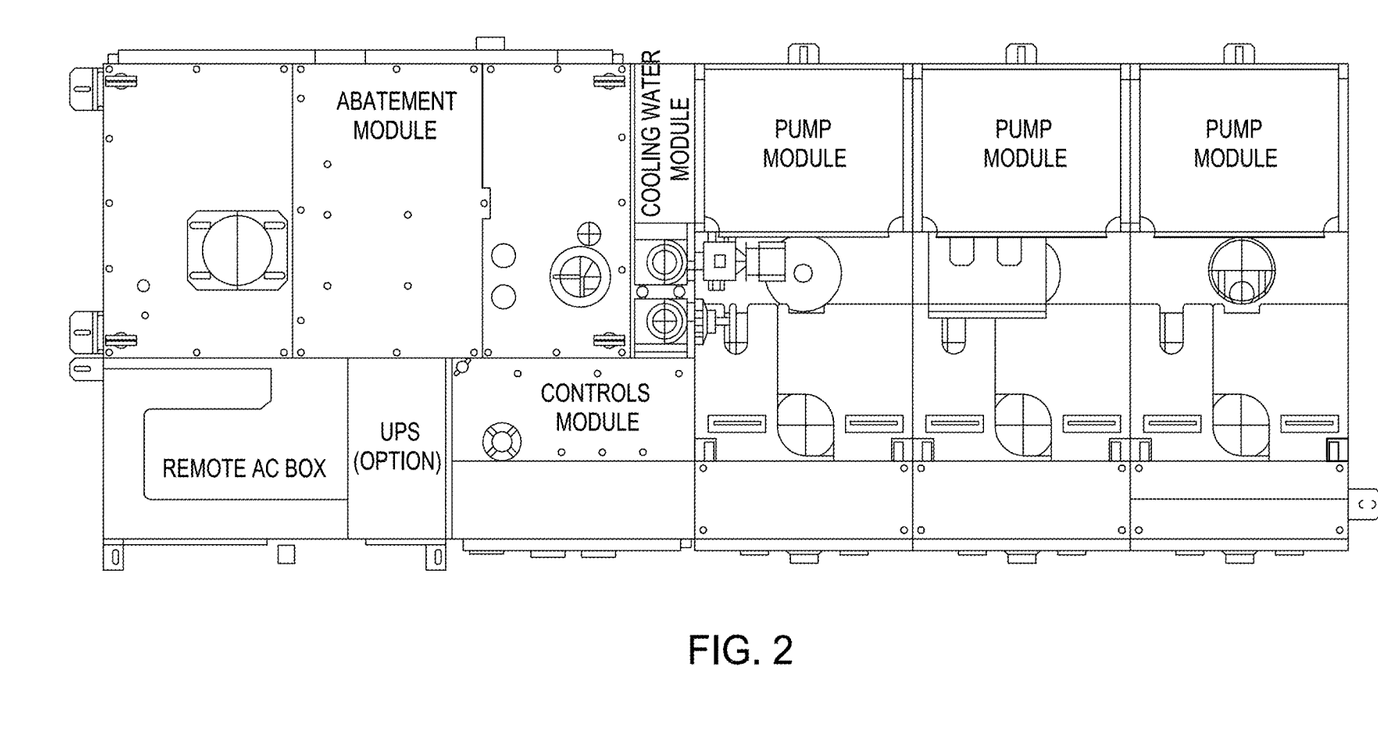
FIG. 2 is a schematic depiction of an integrated sub-fab system for use in an electronic device manufacturing system in accordance with some embodiments of the present invention.

In some embodiments, the integrated sub-fab system communicates with an "open platform" equipment set to provide a lower carbon footprint operation of a process tool for a production application. For example, FIG. 2 depicts one non-limiting configuration of such a system showing a compact, integrated system having an abatement module, a cooling water module, pump modules, a remote AC power box, an uninterruptable power supply (UPS), and a controls module. The open platform advantageously accommodates customer equipment preferences and achieves lowest environmental footprint, best technical performance, highest throughput, and lowest cost of ownership. For example, such a configurable sub-fab system may include one or more abatement units, vacuum pumps, chillers, interconnections for various systems, and utilities distribution in a compact unit synchronized with one or more process tools via an integrated sub-fab controller (such as sub-fab front end controller 108, discussed above). In addition, the energy control system as described herein may also be utilized in existing or new facilities with dispersed components (e.g., not compactly configured as in FIG. 2).

The integrated sub-fab can utilize signals and control capability to manage, for example: pumps to control process chamber exhaust and pressure, chillers or heaters to control chamber or component temperatures optimal for the process (tool specific best known methods (BKMs)), and the abatement tool most appropriate for the process tool emission requirements (e.g., process recipe-dependent energy savings based upon setpoint control for particular recipe). Optionally, local A/C, process cooling water, air handlers, chemical delivery systems, purge flows, power conditioning, cabinet exhaust flow, local thermal cross exchange, etc. can be managed by the integrated sub-fab controller.

The integrated sub-fab open platform utilizes sensors within components or appropriate additional feedback sensors (communicated via hard wire RS232 Serial Connection or Ethernet) to maximize overall energy savings on sub-fab equipment (e.g., real-time control for energy savings). This configuration enables safe switching between Full Run, Lower Run Modes, and Idle mode. For example, such communication may facilitate the sub-fab controller to provide safe switching from "full run" to "idle" mode and vice versa upon satisfaction of pre-determined desired criteria.

The integrated sub-fab controller can utilize signals and control capability to provide component warning and shutdown threshold values.

In some embodiments, a communication standard may be established in order to facilitate this energy mode savings to be enabled safely (e.g., to not enable idle mode operation when full run is required).

In some embodiments, a data table of the sub-fab controller may be provided with internal registry addresses where setpoints for different parameters (such as process gas, fuel, cool dry air (CDA), water, temperature, pressure, throttle valve position, abatement system operational parameters, bypass valve position, and the like) can be manipulated, and/or data logged, and reports generated. The data table of the controller must also provide registry addresses for all alarms and warnings as well as analog I/O points that need to be monitored (such as pressure, temperature, and the like.)

The standard communication will also include a watchdog timer, allowing all sub-fab equipment to revert to a safe high energy mode use (e.g., full run) if the communication is lost. For example, the abatement controller program may include a watchdog timer to monitor the communication with the integrated sub-fab system. If communication is lost, the abatement system should default to high energy mode and reset all the setpoints for fuel, CDA, water, etc., to the default values.

In some embodiments, an interface specification for the integrated sub-fab controller may include an Ethernet or RS232 serial connection, or the like. An Ethernet communication standard may be implemented by providing an abatement controller with an Ethernet module. A unique IP address will be assigned to each abatement module (e.g., each abatement unit). The IP address may be easily configurable in the field. Communication may be provided over TCP/IP 10BaseT.

An RS232 serial communication standard may be implemented by providing the abatement controller with a 9 pin serial port. Serial port settings will be given. Communication may be over an RS232 serial cable to a NET232 adapter which converts to TCP/IP 10BaseT.

For example, in some embodiments the integrated sub-fab system may employ Ethernet and/or RS232 Serial communications through an open platform of apparatus to achieve a reduced carbon footprint during electronic device manufacturing. For this example, the system could include a process tool set and controller linked by sensors or software interconnect with one or more sub-fab or local factory auxiliary systems that can be operated in one or more states of energy consumption. These one or more auxiliary systems can be switched between different levels of energy consumption, as required by the process, via the controller. The integrated sub-fab system may also measure and tabulate the energy consumed for each component in real time, or as requested reporting. For many auxiliary components or systems the integrated sub-fab system utilizes existing signal outputs, for others they may employ secondary sensors or monitors.

Figure 3:
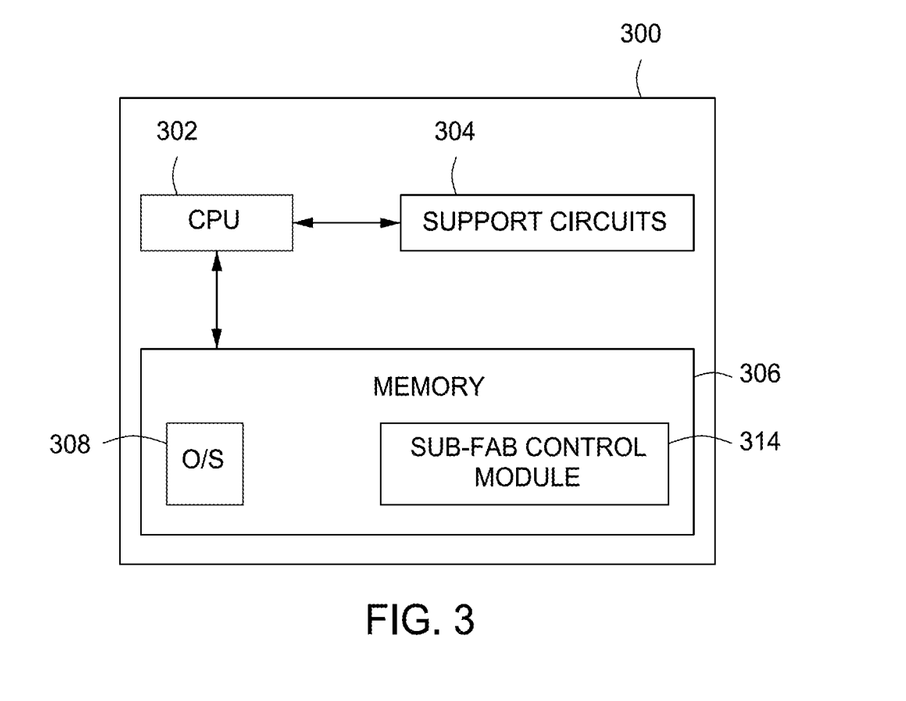
FIG. 3 is a block depiction of a controller for operating and configuring one or more manufacturing system sub-fabs in accordance with some embodiments of the present invention.

FIG. 3 depicts a block diagram of a controller 300 for controlling one or more manufacturing system sub-fabs in accordance with embodiments of the present invention. In some embodiments of the present invention, the controller 300 may be implemented as a process tool controller 102 or a sub-fab front-end controller 108 as discussed with respect to FIG. 1. In some embodiments, the controller 300 is linked by sensors or a software interconnect with one or more sub-fabs or local factory auxiliary systems that can be operated in one or more states of energy consumption. These one or more auxiliary systems can be switched between different levels of energy consumption, as required by the process, via the controller. The controller 300 may also measure and tabulate the energy consumed for each component for real time or as requested reporting. In some embodiments, the controller 300 utilizes existing signal outputs. In some embodiments, the controller 300 employs secondary sensors or monitors.

In some embodiments, the controller 300 comprises a central processing unit (CPU) 302, a plurality of support circuits 304, and a memory 306. While the present exemplary embodiment of a controller 300 is discussed with respect to a computer having a CPU, support circuits, and a memory, one of ordinary skill in the art would recognize that the controller 300 could be implemented in a variety of ways, including as an application specific interface circuit (ASIC), a field-programmable gate array (FPGA), a system-on-a-chip (SOC), and the like. Various embodiments of the controller 300 may also be integrated within the process tool controller 102 or the sub-fab front-end controller 108, with corresponding input/output interfaces as known in the art.

The support circuits 304 may include a display device as well as other circuits to support the functionality of the CPU 302. Such circuits may include clock circuits, cache, power supplies, network cards, video circuits and the like The memory 306 may comprise read only memory, random access memory, removable memory, disk drives, optical drives and/or other forms of digital storage. The memory 306 is configured to store an operating system 308, and a sub-fab control module 314. The operating system 308 executes to control the general operation of the controller 300, including facilitating the execution of various processes, applications, and modules to control the one or more manufacturing system sub-fabs.

In operation, the sub-fab control module 314 may utilize signals and control capability to manage one or more system sub-fabs, such as the sub-fabs 112, 114, 116, and 118 as described with respect to FIG. 1. In some embodiments, these signals and control capability may be sent and received via an Ethernet connection or an RS232 Serial Connection. The sub-fab control module 314 sends heartbeat signals to the one or more system sub-fabs to establish a fail-safe operating environment for operating the sub-fabs in a low power state. The process of sending heartbeats to the sub-fabs is described in further detail with respect to FIG. 4.

Figure 4:
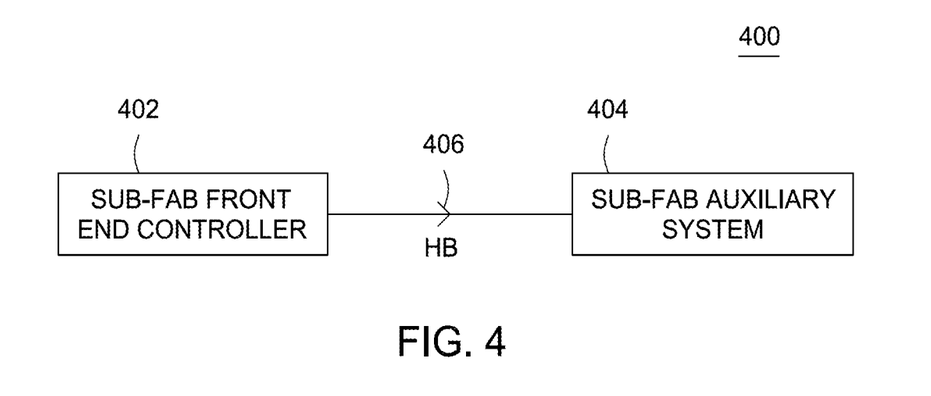
FIG. 4 is a block depiction of a heartbeat signal from a sub-fab front end controller to a sub-fab manufacturing subsystem in accordance with some embodiments of the present invention.

FIG. 4 depicts a block diagram of a communications interface between a sub-fab front end controller 402 and a sub-fab auxiliary system 404, such as the one or more manufacturing system sub-fabs described with respect to FIGS. 1-3. The sub-fab front end controller 402 sends a heartbeat signal 406 at a regular interval to the sub-fab auxiliary system 404. In some embodiments, the heartbeat signal 406 is sent every 2 seconds, but one of ordinary skill in the art would recognize that such a heartbeat interval could be configured for different durations depending upon the needs of the system. When the sub-fab auxiliary system 404 receives the heartbeat signal 406, a timer present on the sub-fab auxiliary system is reset. If the sub-fab auxiliary system 404 does not receive a heartbeat signal before the timer runs out, the sub-fab auxiliary system 404 will default to a high power or full power state. In this manner, the system advantageously provides for a fail-safe communication standard in the event the sub-fab auxiliary system 404 is unable to receive communications from the sub-fab front end controller 402.

In some embodiments, the heartbeat signal 406 takes the form of a request for the sub-fab auxiliary system 404 to enter idle mode, or another low power state such as sleep or hibernate. If the sub-fab auxiliary system 404 does not receive the command to reenter the low power state within the given timeout interval, the sub-fab auxiliary system 404 will enter a full power operational state. In some embodiments, the sub-fab front end controller 402 may only send heartbeat signals when the sub-fab is configured to operate in a low power state, such as idle, sleep, hibernate, or off. In such embodiments, the sub-fab front end controller 402 will not send the heartbeat signal when the sub-fab auxiliary system 404 is configured to operate in a full power operational state.

Figure 5:
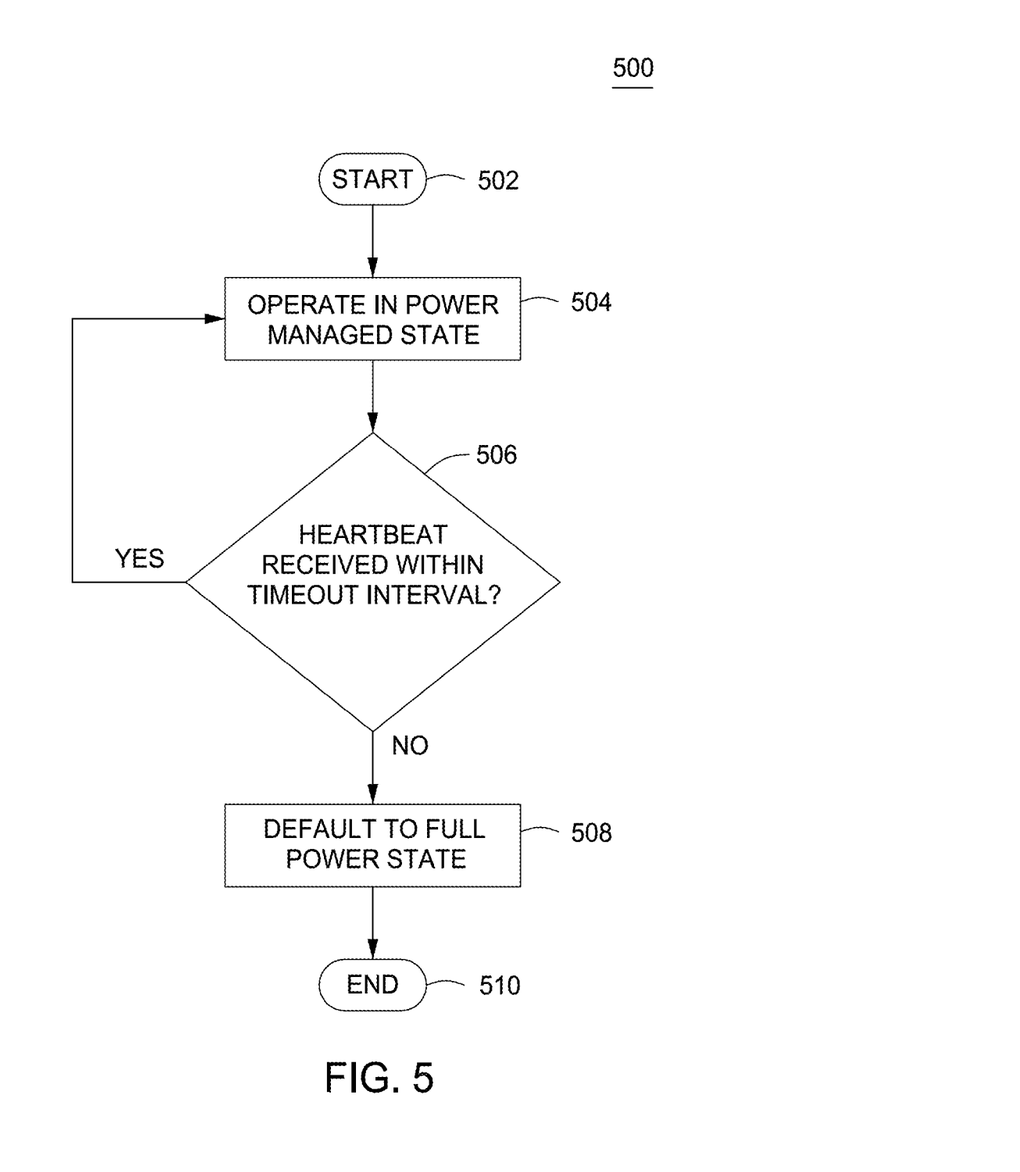
FIG. 5 is a flow diagram depicting a method for implementing a fail-safe communication standard on a manufacturing system sub-fab.

The method by which the sub-fab auxiliary system 404 uses the heartbeat signal 406 to operate in a fail-safe manner is described further with respect to FIG. 5.

FIG. 5 depicts a flow diagram of a method 500 for implementing communication standard establishing a fail-safe low power operation mode for one or more manufacturing system sub-fabs in accordance with embodiments of the present invention. The method 500 begins at step 502 and proceeds to step 504. At step 504, the manufacturing system sub-fab operates in a power managed state. For example, if the particular manufacturing system sub-fab is not needed during the current step of the manufacturing process, the sub-fab may have receive a communication from a sub-fab front end controller indicating that the sub-fab should enter an idle or sleep state. If the sub-fab is needed for the particular step of the manufacturing process, or an upcoming step, the sub-fab front end controller may send a command to cause the sub-fab to enter a full operational state. In the power managed state, the sub-fab is reliant upon the sub-fab front end controller for direction as to the current operational power usage state. The method 500 then proceeds to step 506.

At step 506, the method 500 determines whether a heartbeat signal has been received within a given timeout interval. The manufacturing system sub-fab is configured to receive heartbeat signals from a sub-fab front end controller at regular intervals. The heartbeat signals indicate that the sub-fab is still receiving signals from the sub-fab controller. A failure to receive a heartbeat within a specified heartbeat interval is indicative of a state in which the sub-fab is no longer capable of receiving commands from the sub-fab front end controller. In such a state, the sub-fab would be unable to receive a command to return to full operational capacity from a low power state, due to the disruption in communications. As such, safety and wafer quality problems may occur due to the inability of the sub-fab to return to operational capacity. In some embodiments, the timeout interval is 2 seconds, but one of ordinary skill in the art would recognize that such a timeout interval could be configurable depending upon the needs of the process tool and the manufacturing system sub-fab. For example, a longer timeout interval may be appropriate if the given manufacturing system sub-fab is not related to site safety or wafer quality. If a heartbeat signal has been received within the timeout interval, the method 500 returns to step 504 where the sub-fab continues to operate in a power managed state. If the sub-fab has not received a heartbeat signal within the timeout interval, the method proceeds to step 508.

At step 508, the sub-fab defaults to a full power operational state, since it has not received a heartbeat signal from the sub-fab front end controller for longer than the heartbeat timeout interval. This state is indicative of a loss in communications from the sub-fab front end controller, and thus the sub-fab cannot be sure of the current state of the process tool. The process tool may have entered a phase of the manufacturing process where the sub-fab is needed to operate at full capacity, but without communications from the sub-fab front end controller the sub-fab is not aware of the tool operational state. As such, the sub-fab defaults to full power operation to provide a fail-safe solution for a loss of communications with the sub-fab front end controller.

While the foregoing is directed to embodiments of the present invention, other and further embodiments of the invention may be devised without departing from the basic scope thereof.

What is claimed is:

1. An apparatus for providing a fail-safe communications standard for a power managed sub-fab, comprising:
   a sub-fab configured to:
   operate in a low power state based upon one or more commands received from a sub-fab front end controller;
   tabulate an energy consumed by the sub-fab during sub-fab operation;
   receive heartbeat signals sent from the sub-fab front end controller at regular intervals; and
   operate in a full power operational state in response to failing to receive any heartbeat signals for a specified timeout interval,
   wherein the sub-fab is further configured to reset setpoints to default values associated with an entry to the full power operational state for at least one of process gas, fuel, cool dry air (CDA), water, temperature, pressure, throttle valve position, or bypass valve position in response to failing to receive any heartbeat signals for the specified timeout interval.

2. The apparatus of claim 1, wherein the specified timeout interval is two seconds.

3. The apparatus of claim 1, wherein the sub-fab is further configured to re-enter the low power state in response to receiving any heartbeat signals after the sub-fab begins operating in the full power operational state.

4. The apparatus of claim 1, wherein the heartbeat signals are only sent when the sub-fab is configured to operate in the low power state.

5. A method for providing a fail-safe communications standard for a power managed sub-fab, comprising:
   operating the sub-fab in a low power state based upon one or more commands received from a sub-fab front end controller;
   tabulating an energy consumed by the sub-fab during sub-fab operation;
   receiving heartbeat signals sent from the sub-fab front end controller at regular intervals;
   determining whether any heartbeat signals from the sub-fab front end controller has been received within a specified timeout interval; and
   operating the sub-fab in a full power operational state in response to a failure to receive any heartbeat signals within the specified timeout interval,
   resetting setpoints to default values associated with an entry to the full power operational state for at least one of process gas, fuel, cool dry air (CDA), water, temperature, pressure, throttle valve position, or bypass valve position in response to failing to receive any heartbeat signals for the specified timeout interval.

6. The method of claim 5, wherein the specified timeout interval is two seconds.

7. The method of claim 5, wherein the sub-fab is further configured to re-enter the low power state in response to receiving any heartbeat signals after the sub-fab begins operating in the full power operational state.

8. The method of claim 5, wherein the heartbeat signals are only sent when the sub-fab is configured to operate in the low power state.

9. A system for providing a fail-safe communications standard for a power managed sub-fab, comprising:
   a sub-fab front end controller configured to:
      send one or more commands to a sub-fab to configure the sub-fab to operate in one or more low power states;
      tabulate an energy consumed by the sub-fab during sub-fab operation; and
      send heartbeat signals to the sub-fab to indicate that the sub-fab is still in communication with the sub-fab front end controller at regular intervals; and
   a sub-fab configured to:
      operate in the one or more low power states as configured by the sub-fab front end controller;
      receive the heartbeat signals from the sub-fab front end controller at regular intervals; and
      operate in a full power operational state and reset setpoints to default values associated with an entry to the full power operational state for at least one of process gas, fuel, cool dry air (CDA), water, temperature, pressure, throttle valve position, or bypass valve position in response to a failure to receive any heartbeat signals within a specified timeout interval.

10. The system of claim 9, wherein the specified timeout interval is two seconds.

11. The system of claim 9, wherein the sub-fab is further configured to re-enter one of the one or more low power states in response to receiving any heartbeat signals after the sub-fab begins operating in the full power operational state.

12. The system of claim 9, wherein the heartbeat signals are only sent when the sub-fab is configured to operate in the one or more low power states.

* * * * *